United States Patent Office 3,101,857
Patented Aug. 27, 1963

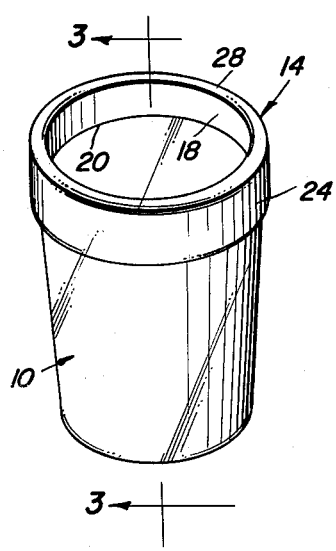
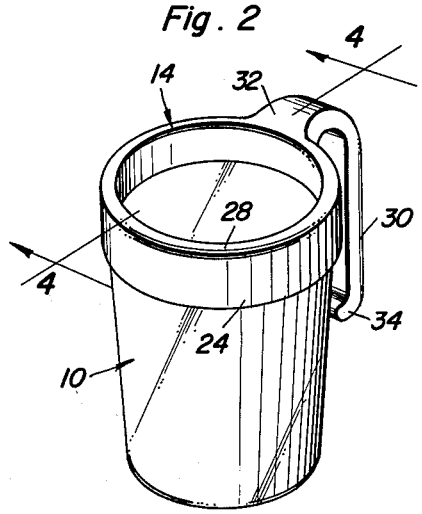
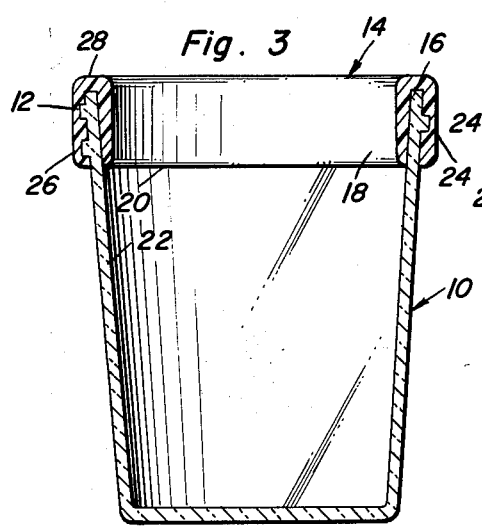
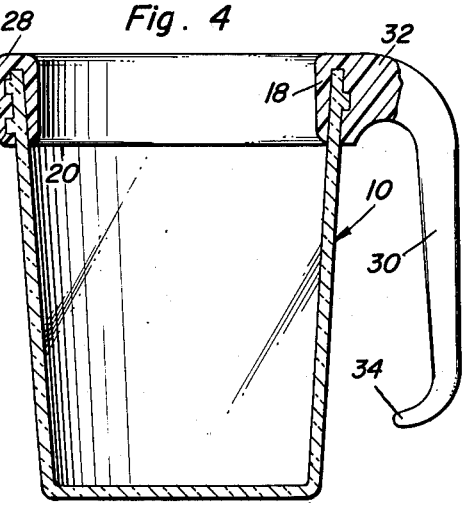

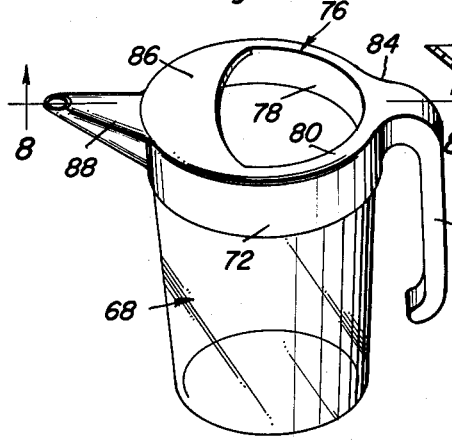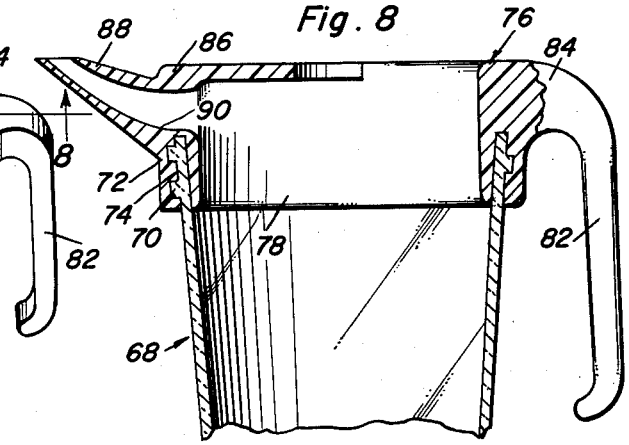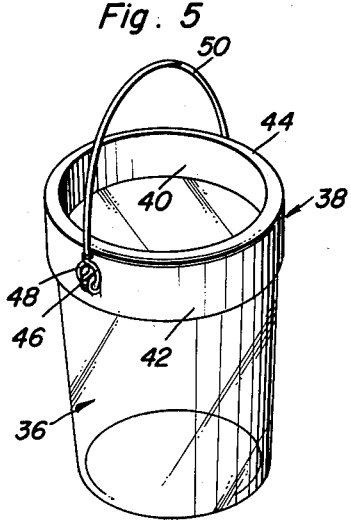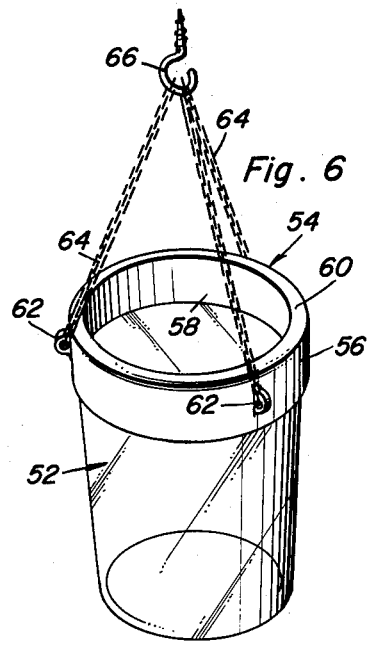

---

3,101,857
ATTACHMENTS FOR COMMODITY JARS AND GLASSES
Melvin H. Freedman, Stamford, Conn., assignor of fifty percent to Jayme Products, Inc., Jersey City, N.J., a corporation of New Jersey
Filed Jan. 18, 1962, Ser. No. 167,039
4 Claims. (Cl. 215—100)

The present invention relates to simple, practical and novel means through the medium of which edible commodity jars, usually made of glass, may be preserved after they have been emptied and then converted in one way or another for varying needs and purposes as will be hereinafter explained.

Stated somewhat more in particular the concept has to do with jar attachment means for the type of jar which is used for marketing jelly, jam, peanut butter, mayonnaise and the like and which has a screw-threaded neck for accommodation and retention of a metal, plastic or equivalent closing cap with a screw-threaded rim. It is no doubt common practice for housewives and others to preserve for one reason or another, both the jar and cap, after the contents have been emptied therefrom. On the other hand it is reasonable to assume that, by and large, these lidded jars are perhaps regarded as trash and are consequently thrown away. Manifestly, jars and glasses in the category under consideration are susceptible of being kept on hand and reused in a number of different ways.

One objective in the instant matter is to provide simple, practical and economical attachment means which can be brought into use after the aforementioned jar has been emptied and otherwise made ready for use, the means, generically speaking, comprising a suitably molded and shaped plastic attachment having screw-threads which may be screwed on the existing threads on the stated jar.

Generally speaking the attachment, which may be described as a plastic annular or equivalent collar is used as a drinking aid. This is to say, when the attachment is in position in the manner herein disclosed it constitutes a practical and acceptable drinking aid and conditions the otherwise objectionable portion of the mouth of the jar so that it is smooth and acceptably suitable as an efficient drinking aid.

Somewhat more explicity stated the invention comprises a ring-like or annular attachment which is essentially in the nature of a smooth-surfaced plastic collar, the same being molded to include a groove or channel and the outer wall or flange of the channel being screw-threaded to match and coincide with the existing or stock threads on the aforementioned jar or glass whereby to thus provide a jar and an attachment which, collectively considered, provides a novel combination of component parts.

Not only is the utility of a discardable peanut butter or equivalent jar extended, the attachment is made of a grade of commercial plastics which lends itself to cleansing in boiling water, the attachment being removable so that all surfaces of the jar and all surfaces of the attachment may be kept clean and sanitary in a feasible and practical manner.

Another aspect of the overall concept pertains to a screw-threaded plastic or equivalent collar which may be provided with an integral handle, which may be equipped with a handle and also a pouring spout, equipped with a suspension bail, or hanger chains to thus provide a drinking mug, a pitcher, pail or a suspended planter as the case may be.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of a so-called jelly glass or jar showing the aforementioned plastic or equivalent collar attached and serving as a drinking aid, sometimes referred to as a conversion lip;

FIGURE 2 is a similar view, that is a view in perspective showing the jar and attachment combination but adding thereto a handle and providing what is distinguishably referred to as a drinking mug;

FIGURE 3 is a view on an enlarged scale taken on the plane of the vertical line 3—3 of FIGURE 1 looking in the direction of the arrows;

FIGURE 4 is a section on the line 4—4 of FIGURE 2;

FIGURE 5 is a view in perspective of a modification similar to that seen in FIGURE 1 but with a wire or an equivalent bail added for suspension means and thus providing a pail or so-called planter, that is, an adaptation which may be employed as a flower pot for indoor (as is generally the case) use;

FIGURE 6 is also a view in perspective similar to FIGURE 5 and showing, instead of the handle-like bail, suspension chains to be hung from a hanger hook;

FIGURE 7 is a view in perspective which again shows the empty commodity jar and an attachment thereon, the attachment in this instance being fashioned to provide both a handle and a pouring spout thus providing a pitcher, "watering can" or the like; and FIGURE 8 is an enlarged view fragmentarily shown and in section and elevation taken approximately on the plane of the line 8—8 of FIGURE 7 looking in the direction of the arrows.

Atttention is first directed to the simplest form of the invention which may be said to be that depicted in FIGURES 1 and 3. In these views the container is denoted generally by the numeral 10 and, as suggested, it is to be recognized as a jelly glass or what would alternatively be referred to as a glass or equivalent jar for peanut butter, jam, relishes and so on. In the showing the container is, of course, empty the usual screw cap (not shown) having been removed and therefore the upper mouth portion of the jar is provided with the usual external screw-threads 12 which in the instant situation are used for attaching and retaining the conversion attachment or collar 14. The container or jar being circular in cross-section the attachment is annular in plan and is so constructed that it is readily applicable and removable. Manifestly, the cross-section might be said to be U-shaped or channel-shaped and the cross-sectional dimension may be recognized as appreciably less than the depth of the receptacle portion of the container. Otherwise considered the collar may be and preferably is construed as having an endless channel or groove 16 which is of a cross-section to accommodate the lip or mouth portion of the container. The inner wall or flange of the channel is denoted at 18 and the lower edge thereof 20 tapers to feather edge dimensions to merge with the cooperating surface 22 of the jar or container. The outer wall 24 is of the same cross-sectional depth as the wall 18 and the interior surface thereof is suitably screw-threaded as at 26 to accommodate the aforementioned threads 12. The connecting web 28 joins the upper edges of the walls 18 and 24 and is convexly rounded and in fact all of the exposed surfaces are expertly molded to be smooth and aceptable for contact with the prospective user's lips. It follows that with the attachment 14 in place the jar or container 10 is transformed or converted to provide a highly acceptable and satisfactory drinking glass for whatever purposes the same may be used. Inasmuch as jars in the screw-threaded neck category come in different sizes it will be evident that the attachment 14 will be, of course, manufactured to properly coincide when brought into use.

It is believed that the same reference numerals may be satisfactorily applied to the corresponding or like parts in FIGS. 2 and 4. In fact, the only difference, which is hardly a modification in a technical sense, is the addition of a handle or handgrip. This handle is denoted at 30 and may be said to be non-circular in cross-section with the upper end thereof of stout cross-section as at 32 and joined to the outer peripheral surface of the wall 24. The lower free end 34 is directed inwardly toward the jar or container 10 and hence the jar with the attachment thereon provides a highly satisfactory mug. Both devices add the feature of safety, namely, safety against cutting one's lip on a chipped edge of a glass container. Both devices also add a measure of extra durability, since the glass is protected to some degree against breakage of lateral force or dropping over on the side. It may be stated at this point that a wide field of adaptation for the concept exists in relation to other areas, for example, with the herein disclosed attachments in use or on the market coffee manufacturers may be induced to package coffee in glass jars so that when the screw cover has been removed and the jar serves its purposes it may be extended in usefulness merely by providing either of the attachments thereon.

With reference now to FIGURE 5 wherein the conversion results in a combination such as that shown, this adaptation may be conveniently set forth as that shown, this adaptation may be conveniently set forth as a planter or pail. In this arrangement the emptied glass jar is denoted at 36 and it has the already described screw-threaded lip or mouth portion (not here detailed) to accommodate the endless annular collar attachment 38. Here again the attachment is internally screw-threaded (not detailed) to fit over the screw-threaded neck of the jar and it embodies an inner anular wall or flange 40, an outer one 42 and a connecting rounded web 44 which fits over the crown or brim of the container in the same manner as illustrated for example in FIGURE 3. It seemed advisable to mention this form of the invention because it is so similar to FIGS. 1 and 3, for example. The difference here is that on diametrically opposite sides the wall or flange 42 is provided with suitable ears or lugs 46 to accommodate attaching eyes 48 on an appropriate suspension bail or handle 50. It follows that the collar attachment may be with or without the handle 30 or with or without the bail 50 as shown in FIGURE 5 and depending on the particular use which is to be made of the jar or container whereby to economically cope with the objectionable practice of discarding or throwing away useful glass jars.

Along the same line as covered in connection with FIGURE 5 is the arrangement in FIGURE 6 where the glass or jar is denoted at 52 to accommodate the applicable and removable attachment collar 54 which is constructed and screwed in place in the manner already shown in connection with FIGURES 3 and 4 and which has a depending outer peripheral wall 56, an inner wall or flange 58 and a connecting web 60 providing a rounded edge. In this construction circumferentially spaced outstanding lugs are provided as at 62 and these serve to accommodate the lower ends of suitably spaced suspension or hanger chains 64 which may be hung from a suspension hook or the like 66. Here again a simple and practical plant holder or planter is provided.

With reference now to the modification shown in FIGURES 7 and 8 the jar or glass is denoted at 68 and has an upper screw-threaded neck 70 which is threaded into the screw-threads provided on the outer wall 72 as at 74. This is the outer wall of the channel in the plastic attachment collar 76 which here provides a part cover and an adapter. The inner wall is denoted at 78 and the connecting web at 80. A suitable handle is provided at 82 and is joined at 84 to the outer wall. The sector-shaped top portion 86 provides an overflow guard which cooperates with the outstanding pouring spout 88, said spout communicating with the receptacle portion by way of a passage 90 as shown in FIGURE 8.

In addition to the points made it should be noted that the attachment is decorative, has an insulating effect for handling against hot or cold or wet glassware, with threaded tops which have previously been thrown away. It is contemplated that it will reduce costs to the consumer for replacement of broken kitchen glassware. And it will encourage manufacturers to beautify their glass jars since these will now become used after contents have been consumed, in the house.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a container having a normally open top mouth portion, and a readily applicable and removable attachment therefor, said attachment having an open-bottom endless groove defining a channel and interior and exterior walls, the upper lip portion of the mouth of said container telescoping into said channel and said walls encompassing upper interior and exterior wall portions of the container, said container comprising a drinking glass having a normally open top constituting a mouth portion, the exterior surface thereof being screw-threaded, the interior of the outer wall of the channel in said attachment being screw-threaded and removably screwed on the aforementioned external screw-threads and separably interconnected but providing a positive connection between the drinking glass and said attachment, the interior surface of the inner wall of said channel being precision-made and having substantially fluid-tight contact with the surface portions of the drinking glass contacted thereby, and the overall exterior surfaces of said attachment being smooth-finished and adapting themselves to feasible use by the user.

2. The structure according to claim 1, and wherein the attachment is annular in plan, is made of moldable plastic material and is provided on an exterior peripheral surface with an accessible handle located in spaced generally parallel relation to a cooperating wall of said container.

3. The structure according to claim 1, and wherein said container comprises a conventional-type commodity jar which has been emptied of its contents, has been washed and readied for use as a drinking glass, said attachment being made of moldable plastic material, being annular in plan, and a suspension bail, the ends of said bail being hingedly attached to diametrically opposite peripheral surfaces of the outer wall of said attachment.

4. The structure according to claim 1, and wherein said container comprises a conventional-type commodity jar which has been emptied of its contents, said attachment being made of moldable plastic material, being annular in plan, and a plurality of circumferentially spaced suspension chains, upper end portions of which are adapted to be hung from a supporting hook, lower end portions of said chains being securely anchored on an exterior surface of the outer wall of said attachment.

References Cited in the file of this patent

UNITED STATES PATENTS

| | | |
|---|---|---|
| 2,169,778 | Wildermann | Aug. 15, 1939 |
| 2,312,380 | Bernhardt | Mar. 2, 1943 |
| 2,569,139 | Abelson | Sept. 25, 1951 |
| 2,581,768 | O'Casey | Jan. 8, 1952 |
| 2,963,204 | Pottle | Dec. 6, 1960 |